(12) United States Patent
Petrounevitch

(10) Patent No.: US 8,177,480 B2
(45) Date of Patent: May 15, 2012

(54) MODULAR SYSTEM FOR GENERATING ELECTRICITY FROM MOVING FLUID

(76) Inventor: Edouard Petrounevitch, Toronto (CA)

( * ) Notice: Subject to any disclaimer, the term of this patent is extended or adjusted under 35 U.S.C. 154(b) by 1267 days.

(21) Appl. No.: 11/887,075

(22) PCT Filed: Mar. 8, 2006

(86) PCT No.: PCT/CA2006/000326
§ 371 (c)(1),
(2), (4) Date: Sep. 25, 2007

(87) PCT Pub. No.: WO2006/108264
PCT Pub. Date: Oct. 19, 2006

(65) Prior Publication Data
US 2009/0026767 A1    Jan. 29, 2009

(30) Foreign Application Priority Data

Apr. 15, 2005  (CA) ........................... 2504776
Jan. 5, 2006   (CA) ........................... 2531708

(51) Int. Cl.
*F03D 7/06*    (2006.01)

(52) U.S. Cl. ............... 415/4.2; 415/7; 415/906; 416/84; 416/117

(58) Field of Classification Search ............ 415/3.1, 415/4.2, 4.4, 7, 906, 907; 416/17, 117, 140, 416/142, 143, 84, 85
See application file for complete search history.

(56) References Cited

U.S. PATENT DOCUMENTS

| 1,148,989 | A | * | 8/1915 | Reese | 416/117 |
| 1,360,221 | A | * | 11/1920 | Johnston | 416/149 |
| 6,619,921 | B1 | * | 9/2003 | Lindhorn | 416/117 |

* cited by examiner

*Primary Examiner* — Dwayne J White

(57) ABSTRACT

The invention provides a system for producing electricity from the channel, river, ocean or tidal water currents and wind. Each system module contains a vertical axis fluid driven turbine positioned in a protecting housing. The turbine employs a plurality of rotating paddles with mutually perpendicularly oriented asymmetric blades that are non-rotatably fixed by their leading edges to the poles at both ends. The high efficiency of the turbine comes from creating maximum drug force by vertically oriented blades on the power generating side and practically zero frictional force produced by blades on the resting side of the turbine.

4 Claims, 9 Drawing Sheets

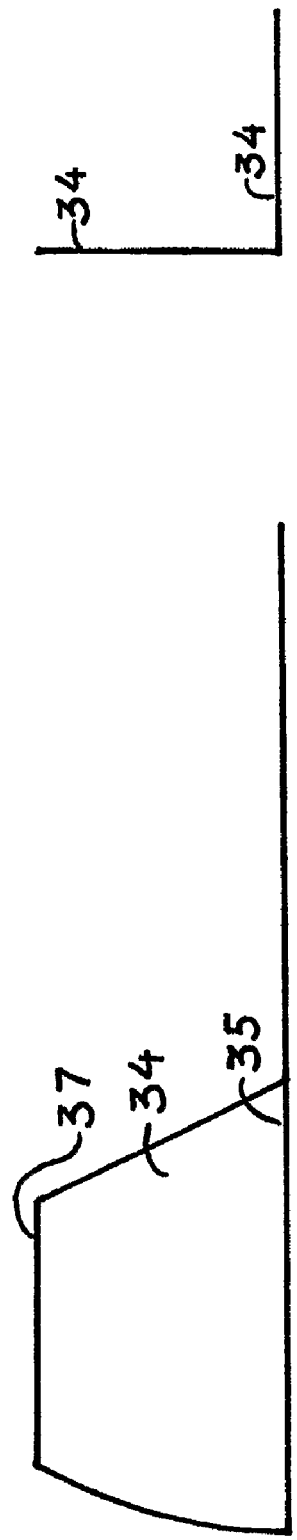
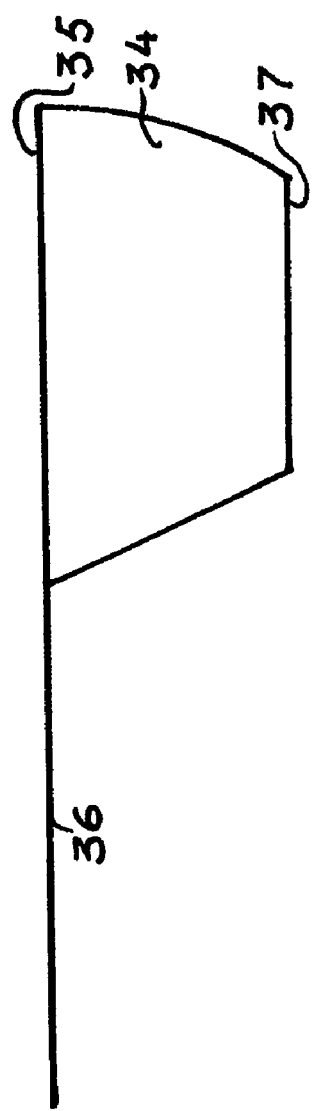

MODULAR SYSTEM FOR GENERATING ELECTRICITY FROM MOVING FLUID

FIELD OF THE INVENTION

This invention relates to modular systems for producing electricity from the kinetic energy present in flowing water or wind.

BACKGROUND

The renewable energy sources are important in order to guarantee a sustainable power production in the future. Hydropower is the largest and the most applied renewable energy source in the production of electricity. Today conventional hydropower is constrained by land use, environmental concerns and high up-front capitalization. The renewable energy technology, such as underwater hydrokinetic energy systems, is a valuable part of the overall solution.

These systems are located beneath the water's surface and generate electricity from the kinetic energy present in flowing water. They may operate in rivers, manmade channels, tidal waters, or ocean currents. Hydrokinetic systems utilize the water stream's natural pathway. No dam or impoundment is needed, therefore there is no major civil work to change the landscape, disturb the local ecology or uproot communities. There are no toxic by-products produced in the generation of electric power. As long as the rivers flow and the tides rise and fall, the hydrokinetic systems produce electricity or mechanical energy.

The most desirable to implement or cost-effective underwater hydropower system must produce the required amount of electricity and be optimal in terms of cost, size, weight, and reliability. Other essential qualities of such a system are modular design and suitability for both deep and shallow water currents.

A modular hydrokinetic system is made of a number of standardized units or modules that can be fitted together to construct a large power system in a variety of ways. Another advantage of a modular technology is that particular modules may be interchanged, added to or removed from the site system as required (i.e. in response to increases or decreases in system usage requirements). Such gives a time advantage for installation, modification, repairs and maintenance, thereby insuring that the system is more cost-competitive.

Further, there are a very large number of streams and small rivers, which do have significant water flows. It would be advantageous to have a modular constructed flexible underwater system that is suitable to use a variety of both deep and shallow water flows.

Thus there is a need for a robust submersible hydro-turbine system that meets the above-mentioned criteria. Clearly, there is also a need to utilize the energy of wind for generation of electric power.

The present invention is intended to satisfy that needs.

DESCRIPTION OF PRIOR ART

In an underwater hydropower system, the kinetic energy of flowing water is transformed into mechanical energy by use of a turbine. The mechanical energy is then utilized to turn a generator and produce electrical energy. There are several different types of underwater turbines. In general, underwater turbines of the prior art have been of three types, namely:
  Turbines having a horizontal axis of rotation;
  Helical turbines;
  Turbines, which have a vertical axis of rotation.

The art of interest will be discussed in the order of their perceived relevance to the present invention.

Horizontal Axis Hydro Turbines

This category covers devices, which are known as Submersible Propeller Water Turbines or Underwater Windmills. The design of these turbines consists of a concentric hub with radial blades, similar to that of a windmill. Mechanical power is applied directly through a speed increaser to internal electric generator, or through a hydraulic pump that in turn drives an onshore electric generator.

A propeller turbine generally has a runner with three to six blades in which the water contacts all of the blades constantly. The pitch of the blades may be fixed or adjustable. A propeller mounted on the front of the turbine is attached to an alternator inside the main turbine housing. When submerged in a fast moving water source, the propeller is rotated by the force of the passing water.

Examples of Horizontal Axis Hydro Turbines are disclosed in U.S. Pat. Nos. 6,472,768, 6,267,551, 6,254,339, 5,798,572, 5,226,804, and 4,613,279. Such companies as Verdant Power, UEK Corporation, Marine Current Turbines Ltd. are also pursuing similar technologies for underwater power generation. Information is available on their websites at:
http://www.verdantpower.com/Tech/lowimpact.shtml
http://uekus.com/index.html
http://www.marineturbines.com/home.htm respectively.

Propeller style generators work well for locations with fast moving, relatively deep streams. Clearly, devices such as these are simply too large for use in streams of shallow rivers. Additionally, they fail to allow for modular system installation requiring relatively complex and consequently costly construction. And, most importantly, these turbines are the least efficient of the three styles.

Helical Turbine

This turbine is a low head, reaction cross-flow hydraulic turbine. The blades have hydrofoil sections that provide tangential pulling forces in the cross water flow. These forces rotate the turbine in the direction of the leading edge of the blades. Thus, the direction of turbine rotation depends only on orientation of blades and not on direction of fluid flow.

The Texas company GCK Technologies Inc. is using the helical turbine system described in the U.S. Pat. No. 6,036,443, issued to Alexander Gorlov. The system is capable of providing high-speed unidirectional rotation under a multidirectional low-head fluid flow. The company website (http://vww.gcktechnology.com/GCK/pg2.html) provides results of modeling and testing of different types of turbines in free fluid flows. The resulting data have shown that the maximum efficiency of the propeller style turbine (discussed above) is about 30 percent. The helical turbine has an efficiency of the 35 percent, making it preferable for use in free water currents.

Vertical Axis Hydro Turbines

The company Blue Energy Canada, Inc. is the pioneer of using Darrieus turbine for harvesting energy of water streams. Their basic design (see their website www.bluenergy.com) utilizes vertically oriented turbine into a frame that is connected to the sea bottom.

As it has been noticed in the U.S. Pat. No. 6,293,835, issued to Alexander Gorlov, the Darrieus turbine rotates with a strong pulsation due to accelerations of its blades passing through the higher-pressure zones in the fluid that lowers the efficiency of the turbine.

The article "New Turbine Can Extract Energy from Flowing Water" by Sara Steindorf and Tom Regan, Published on Thursday, May 17, 2001 in the *Christian Science Monitor*, provides data that in flowing water the Gorlov helical turbine captures 35 percent of the water's energy, compared with only 23 percent for a straight Darrieus turbine (see the on-line version of the article at http://www.commondreams.org/headlines01/0517-05.htm).

Currently known the most efficient prototype of the turbine, which applicant is aware of, is the Patent Pending Vertical Axis Wind or Hydro-Turbine, invented by Robert D. Hunt. A video of operation of the wind turbine may be seen by clicking on the following link: http://www.fuellessflight.com/windturbine.htm. A full engineering report that shows the efficiency of the new turbine at forty-four percent (44%) is available upon request from the link: http://www.fuellessflight.com/inforequest.asp.

How the turbine works: Rotatable shutters mounted on a circular disk automatically open when directed into the wind, regardless of the wind's direction. Pairs of upper and lower shutters are geared together. The lower shutter acts as a counterweight to the upper shutter. The bottom shutter opens in the downward direction and its weight helps to lift the upper shutter in the upward direction, as the wind applies an opening force against both shutters. When the shutters reach the vertical position, stops prevent them from opening further and the force of the wind is transferred from the open shutters to the circular disk. And the circular disk is attached to the vertical axis for power output. The circular disk, shutters, and outer vertical axis rotate together. The outer vertical axis is mounted via bearings over an inner vertical axis that is stationery.

The shutters are closed by the blowing wind (no stops in the opposite direction) as they reverse direction during their rotation and move into the wind on the opposite side of the wind turbine. When the wind is not blowing, the shutters open by gravity because the lower shutter is weighted to be slightly heavier than the upper shutter and it therefore can cause the upper shutter to open via the force of gravity as the two shutters are geared together. Wind blows against the open shutters and the open shutters with stops apply a force against the disk, but the open shutters with no stops (opposite side going into the wind) merely close due to the force of the wind (not applying a force against the disk) and the wind turbine begins spinning no matter what direction the wind comes from.

The high efficiency of the new turbine comes from creating a high drag force on the power generating side of the turbine with open shutters that the wind or water does work on and that move backward with the motion of the wind. The opposite side of the turbine produces a low frictional force as the disk moves forward into the wind with the shutters folded down into the disk. Its efficiency increases with the degree of differential between a drag force and a frictional force. The greater the surface area of the shutters on the drag side of the wind or water turbine that transfers kinetic energy to the shutters and the lower the surface area of the disk with the shutters folded down into the disk on the frictional side, the greater the efficiency of the wind turbine.

However, this invention has a number of problems.

Firstly, the main problem with this type of equipment is the inherited conflict of interests between two forces: a gravitational force trying to keep the shatters opened, and an opposing frictional force trying to close the shatters on the frictional side of the disk. When the wind is not blowing, the shutters are opened by gravity. When the slow or modest wind is blowing, the shatters are only partially closed as the gravitational force still prevails. The unwonted friction of shatters can be equal to zero only if their surface areas are parallel to the movement of the fluid currents. But, even in this hypothetical case, the gravity will not have any opposing forces and, therefore, will reopen the shatters producing an unwonted friction. It is apparent from the foregoing that this drawback substantially decreases the turbine's efficiency.

Secondly, this type of equipment fails to be submersible and modular.

Finally, this turbine is connected to a rotor that drives an integrated electrical generator assembly. However, its rotational speed is too slow for direct operation of an electric generator, especially for hydro applications. Therefore, an additional gearing speed increaser may be required, further decreasing the turbine's cost-effectiveness.

It is apparent from the foregoing, that a need exists for a new and improved fluid-energy conversion device that can be used for water or wind driven system for generating electricity. It would be advantageous to minimize the frictional resistance of the rotating blades during the portion of rotation when the fluid is moving in a direction that generally opposes such rotation. In this regard, the present invention significantly fulfills this need. In this respect, the fluid-energy conversion device according to the present invention substantially departs from the conventional concepts and designs of the prior art, and in doing so provides a cost-effective solution primarily developed for the purpose of modular fluid driven system for generating electricity.

OBJECTS OF THE PRESENT INVENTION

The main object of the present invention is to create a new and more practical system for harvesting kinetic energy of river, ocean or tidal currents and wind, by overcoming the drawbacks of the known systems utilizing a new type of a fluid driven turbine.

Another object of the invention is the increase in the entire system efficiency through the increase of turbine efficiency. Employing a vertical axis hydro or wind turbine, having an arrangement of paddles in an innovative way that excludes their main drawback—the unwonted friction of the turbine blades due to fluid resistance, achieves this. Such a turbine surpasses the efficiencies of other known fluid driven turbines.

It is yet another object of the invention to produce a fluid flow energy converter, which is capable of modular installation, such that particular units may be added to or removed from a particular location as required.

It is a further object of the invention to produce a fluid flow energy converter, which can be installed below the surface and upon the ocean or river floor, thus providing a vast number of possible site-locations for installation of such a device.

Lastly, it is an object of the present invention to provide a new robust and cost-effective modular system for generating electricity that has a low cost of manufacture with regard to both materials and labor, and having a low need for maintenance.

These and other objects of the present invention will become readily apparent upon further review of the following specification and drawings.

SUMMARY OF THE INVENTION

The present invention provides a system for producing electricity from the kinetic energy present in flowing water or wind. The system may operate in rivers, manmade channels, tidal waters, or ocean currents.

The embodiments of the system comprise a set of interconnected units or modules. Each module contains a fluid flow energy converter positioned in a protecting housing with proper bearings. A converter consists of a detachable vertical axis fluid driven turbine, connected to the detachable electrical generator. The converters for water applications embodiments also include flow deflectors.

The turbine is essentially a paddlewheel having an arrangement of attached paddles with mutually perpendicularly oriented asymmetric blades that are fixed to the poles at both ends. Such orientation of blades provides a positive feedback minimizing the blades' friction and maximizing the turbine's performance. Attached to the wheel support members hold the paddles while stops limit the rotation of paddles within the right angle range.

The electrical generator transforms the rotational energy of the turbine into electricity. It is attached to the rim of the turbine's wheel, which serves as gear to avoid the need for a gearing speed increaser, which would otherwise be required to connect a slowly spinning paddlewheel's hub to an electrical generator.

The flow deflectors funnel incoming water current through the working part of the turbine and protect the resting (opposite) part of the turbine from moving water. It further decreases the blades' friction and increases the fluid velocity through the turbine thereby enhancing the power output of the converter.

A protecting housing comprises a strong steel frame, which supports the turbine, flow deflectors, and the electrical generator. The filter panels and screens, cover the frame's entrances to prevent clogging of the module by submerged objects (debris) carried by water current or to prevent collisions with birds for wind power applications.

One or more modules can be anchored at various locations in a river or ocean for the purpose of generating electricity, pumping water or operating mechanisms or the like.

The system's modularity allows it to be assembled by bolts, screws and conventional anchoring pieces. Such gives a time advantage for assembly and maintenance. The array of these modules may be arranged side by side, so as to intersect any cross sectional area of the flow nearly completely, thus providing versatile forms of hydroelectric power systems which are inexpensive to build, install and maintain.

The present invention, unlike previous efforts to generate electricity from moving fluid, is practical and economical because its design uses both a new turbine, which surpasses the efficiencies of other known fluid driven turbines, and a durable simple construction to achieve long term unattended operation.

There are four preferred embodiments of the system.

The embodiment A is the system assembly comprising an array of interconnected submersible modules capable of harvesting the kinetic energy from unidirectional river and ocean currents.

The embodiment B is the system assembly comprising an array of interconnected submersible modules capable of harvesting the kinetic energy of tides that alternate direction of their movement on 180 degrees.

The embodiment C is the system assembly comprising an array of interconnected modules capable of harvesting the kinetic energy of wind.

The embodiment D is the system assembly comprising an array of interconnected venturi-shaped bidirectional converting modules capable of harvesting the kinetic energy of tides.

BRIEF DESCRIPTION OF THE DRAWING

FIG. 3 is a frontal view of the paddle;
FIG. 4 is a side view of FIG. 3;
FIG. 5 is a top view of FIG. 3.

DETAILED DESCRIPTION OF THE INVENTION

Embodiment A

Figure 1:
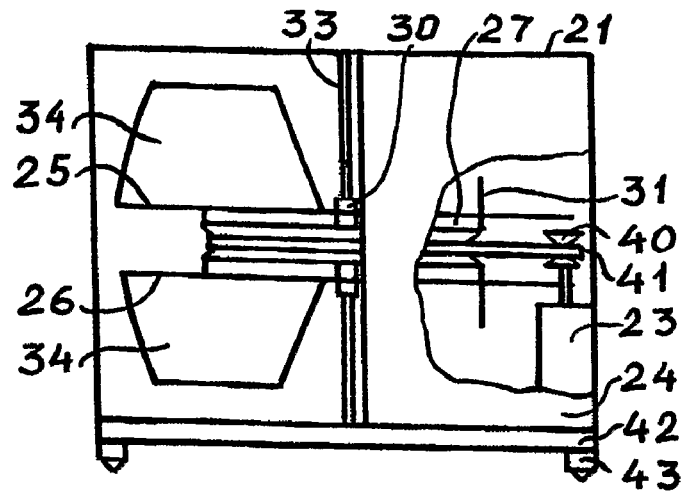
FIG. 1 is a frontal view of the system module for harvesting the kinetic energy from unidirectional flow of water.

The embodiment A is the system assembly capable of harvesting the kinetic energy from unidirectional flow of water for producing electricity. The system comprises an array of interconnected submersible units or modules to harness water power. Each system module (see FIGS. 1 and 2) contains a water current energy converter positioned in a protecting housing 21 with proper bearings.

A converter consists of a detachable vertical axis hydroturbine 22, the detachable electrical generator 23, and detachable water current deflector 24.

The turbine 22 is essentially a paddlewheel having an arrangement of two sets 25 and 26 of attached paddles with asymmetrically fixed blades to increase torque and power output. The first set 25 of paddles with floatable blades is located above the working wheel 27, as the second set 26 of paddles with sinkable blades is located below the working wheel 27. A plurality of radial spokes 28 connects the working wheel's rim 29 to the hub 30. Such radial spokes increase the integrity and structural strength of the turbine.

Both sets 25 and 26 of the paddles are attached to the working wheel 27 by support members 31 such as padlocks or the like. These support members are fixedly mounted to the rim 29 and, possibly, to the hub 30 of the working wheel 27 and have built in stops, which allow the free rotation of the paddles in the right angle range. Generally, each set may comprise any number of paddles (preferably three) made from any suitable material, which is strong and lightweight.

The working wheel's hub 30 is mounted via bearings on its ends over an inner vertical axis 33 that is nonrotatably attached by its ends to the protective housing 21.

As shown in FIGS. 3 through 5, the blades 34 are asymmetrically fixed by their leading edge 35 to the pole 36 at both ends and have a mutually perpendicular orientation. Such orientation of blades provides a positive feedback minimizing the blades' friction and maximizing the turbine's performance.

To ensure the most efficient utilization of the current flow, the blades 34, preferably, have a profile of the partial segment (see FIG. 3) with the distance between parallel leading 35 and a trailing 37 edges not exceeding the half of the segment's radius.

The blades may be manufactured from any suitable material, such as a steel, aluminum, plastic or fiberglass, which provides sufficient buoyancy for the floatable blades, and reasonable gravity for the sinkable blades.

The flow deflector 24 (see FIGS. 1 and 2) funnels incoming water current through the working side 38 of the turbine 22 and protects the resting (opposite) side 39 of the turbine 22 from moving water. It further decreases the blades' friction, reduces resistance to the turbine rotation, and increases the fluid velocity through the turbine thereby enhancing the efficiency and power output of the converter. The blades 34 extend beyond supporting members 31, mounted on the rim 29 thereby increasing torque to spin the turbine.

As discussed earlier, the efficiency of the vertical axis turbine increases with the degree of difference between a drag force created by turbine's blades and their frictional force. The greater the cross sectional area of the blades on the working side of the paddlewheel that transfers kinetic energy to the turbine and the lower the surface area of the paddlewheel on the opposite side, the greater the efficiency of the turbine. The high efficiency of the presented turbine comes from creating maximum drug force by vertically oriented blades on the power generating side 38 and practically zero frictional force produced by horizontally oriented blades on the resting side 39 of the paddlewheel.

When the water is not flowing the sinkable blades of the lower paddles, located below the working wheel, are partially open via the force of gravity creating 45-degree angles between their surfaces and the vertical axis of the turbine. When water flows against the partially opened blades on the power generating side of the paddlewheel the water current applies as an opening force against the blades. The flow deflector 24 protects the resting (opposite) part of the turbine from moving water and, therefore, eliminates applying a force against the blades on the opposite side of the paddlewheel. Two forces (gravity and water flow) start to turn the blades on the power generating side toward their vertical position. The cross flower area is increasing and the turbine begins spinning. At the same time, because of their mutually perpendicular orientation, the blades on the opposite side of the paddles are turning toward their horizontal position, decreasing the frictional force. This creates a positive feedback resulting in further increasing the turbine's spinning. When the blades reach the vertical position, stops prevent paddles from turning further. As a result, the vertically oriented blades create the maximum drug force while the frictional force of the horizontally oriented blades is negligible thereby producing the high efficiency of the presented turbine.

The upper paddles, located above the wheel, work in a similar way. The only difference is that a buoyant force applies to the floatable blades of the upper paddles instead of a gravitational force applied to the sinkable blades of the lower paddles.

The presented vertical axis paddlewheel turbine is far more effective in its operation than is a prior art: (1) the amount of frictional force is negligible because the frictional area of the horizontally oriented blades is close to zero; (2) torque is gained by an increase in horizontal distance instead of an increase in vertical distance, which allows it to be used in shallow water currents with a very low head; (3) it is of simple construction and, therefore, inexpensive to produce; (4) it can be made to have only a small number of wearing parts and thus has a long service life; (5) it is capable of handling large volumes of water without becoming too bulky.

The electrical generator 23 transforms the rotational energy of the turbine into electricity. A generator pulley 40 is coupled to a generator 23. A belt 41 rotatably couples the generator pulley 40 to the paddlewheel's rim 29, which serves as a gear thereby eliminating the need for an underwater gearing speed increaser, which would otherwise be required to connect a slowly spinning paddlewheel's hub to an electrical generator. The belt in the present example is a V-shaped belt. Alternatively, the rim may be coupled to an electrical generator by any suitable means such as a belted tooth-pin transmission or other driven means, as well as any suitable submersible electrical generator may be employed.

Figure 2:
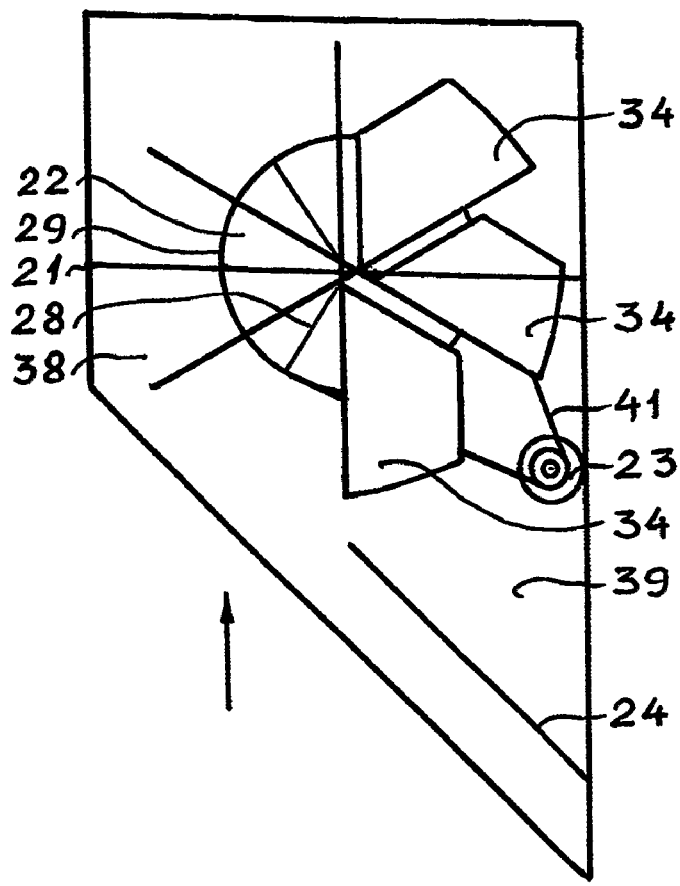
FIG. 2 is a top view of FIG. 1.

The system module's protecting housing 21, shown in FIGS. 1 and 2, is a strong steel frame having a shape of the right trapezoid prism, which supports the turbine 22, deflector 24, and the electrical generator 23. Additionally, the protecting housing includes the detachable filter and screen panels. The filter panels, made of steel bars, cover the front, rear and top entrances of the frame to prevent clogging of the converter by submerged objects (debris) carried by water current. The size of the filter opening is smaller than the spacing between the turbine blades and frame so that any particular matter that passes through the filter can freely pass through the turbine and out the module. The screen panels cover the frame's side entrances and serve both to improve the efficiency of the turbine by creating a described earlier funneling channel together with a flow deflector 24, and to protect the converter from debris.

In order to properly position and secure the system module to a river bed, the protective housing may be bolted to the ballast panel 42 having anchoring means 43, for example concrete blocks. Such a bolted structure allows it to be easily mounted and adjusted to the riverbed profile.

One or more modules can be anchored at various locations in a river or ocean for the purpose of generating electricity, pumping water or operating mechanisms or the like.

The system's modularity allows it to be assembled by bolts, screws and other conventional anchoring pieces. Such gives a time advantage for assembly and maintenance. The array of these modules may be arranged side by side, so as to intersect any cross sectional area of the flow nearly completely, thus providing versatile forms of hydroelectric power systems such as a vertical (FIG. 6), horizontal back slash (FIG. 7), horizontal forward slash (FIG. 8), or any combinations of the above arrangements of the system modules, which are inexpensive to build, install and maintain.

Figure 6:
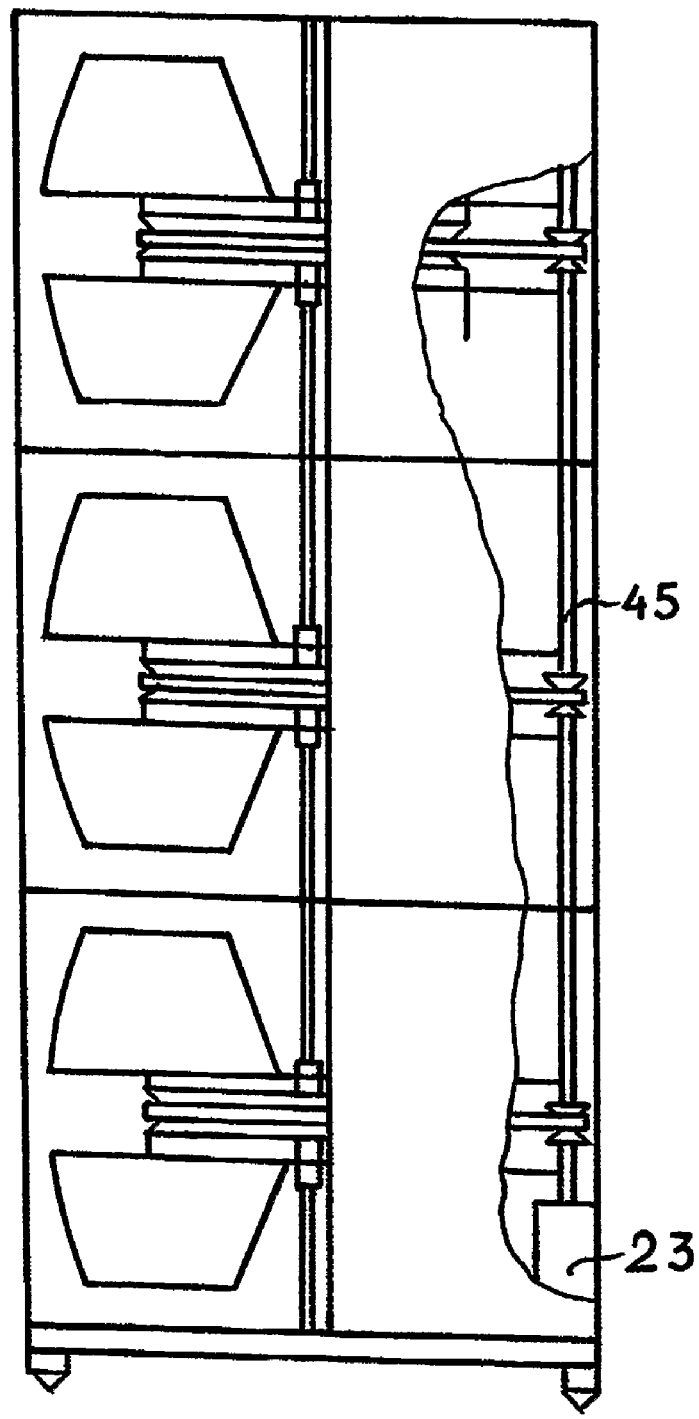
FIG. 6 is a frontal view of the vertical arrangement of an array of the system modules of FIG. 1.

A vertical configuration of the modular system can exploit a common generator 23 for a number of modules providing an additional flexibility to build and maintain the power system (see FIG. 6). The modules may be connected to an electric generator 23 in any suitable manner, such as by a belted transmission and a vertical common shaft 45.

Figure 7:
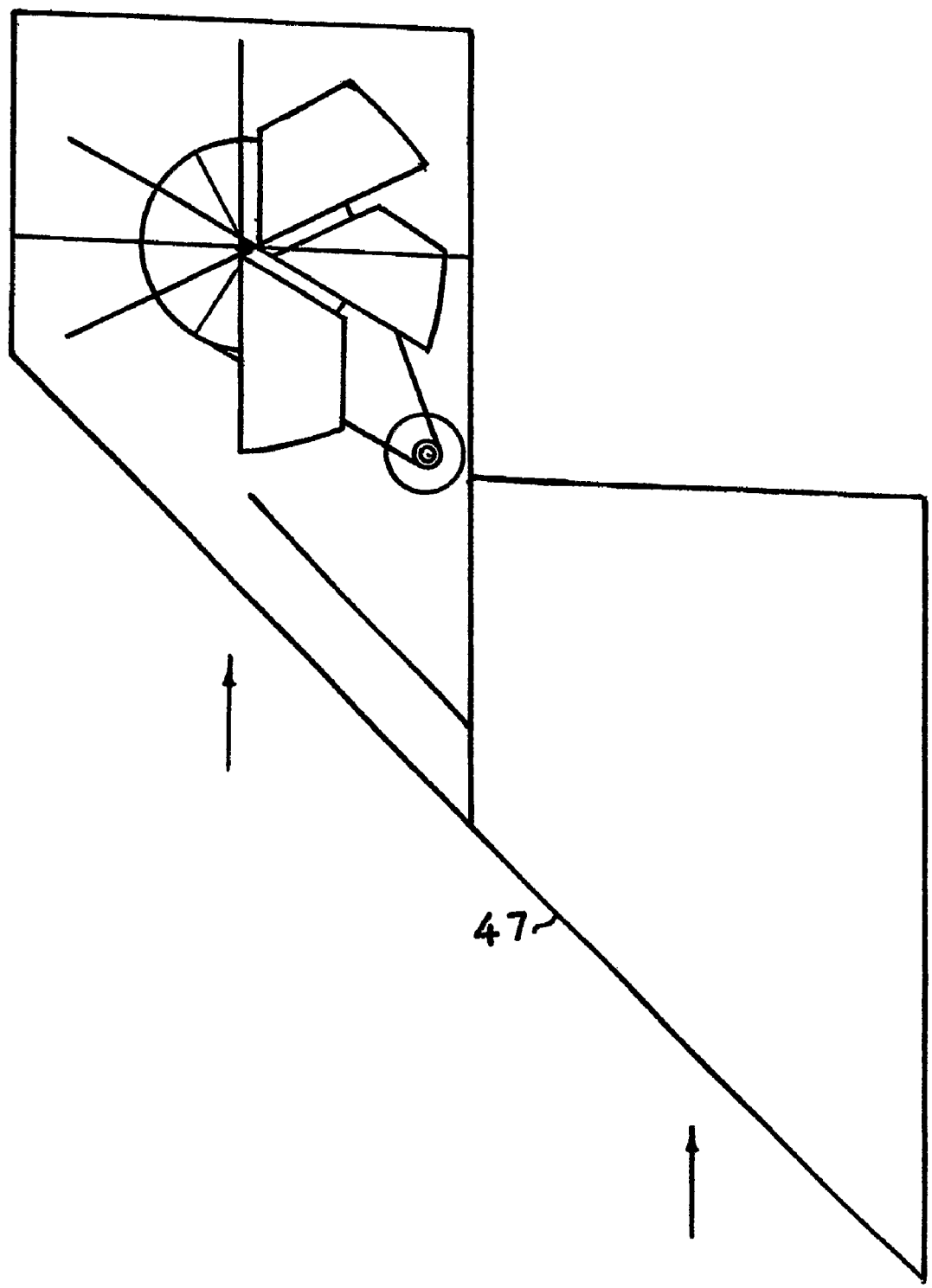
FIG. 7 is a plane top view of the horizontal backslash arrangement of an array of the system modules of FIG. 1.
Figure 8:
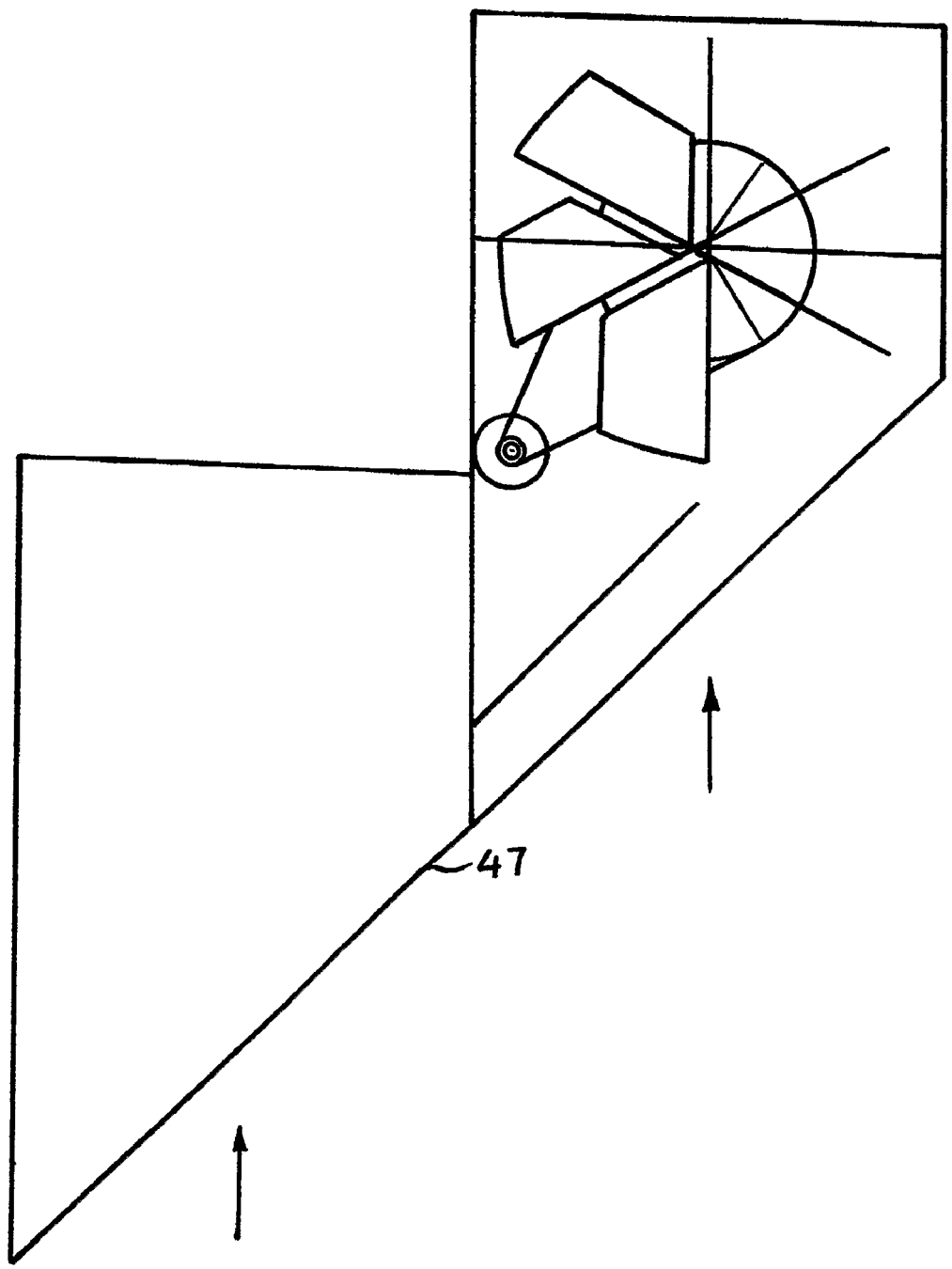
FIG. 8 is a plane top view of the horizontal forward slash arrangement of an array of the system modules of FIG. 1.

It must be appreciated that during the assembling of the systems, illustrated in FIGS. 7 and 8, the common sharp angle filter protection 47 against submerged objects (debris) is created automatically, thereby providing a significant advantage to the prior art.

The electricity produced by the system is transmitted through the flexible underwater cables to the shore. After employing the appropriate voltage regulator and transformers, the generated power then is supplied to the consumers via the power-distributing network.

The nature of the system according to the present invention is such that it need never totally block the natural flow of the river. There is no need for the system to dominate the landscape, endanger fish or interfere adversely with recreational pursuits such as fishing or boating. The system does not change the character of the water stream or create any harmful by-products. Unlike previous efforts to generate electricity from moving fluid, the present invention is practical and economical because its design uses both a new turbine, which surpasses the efficiencies of other known fluid driven turbines, and a durable simple construction to achieve long term unattended operation.

Embodiment B

Figure 9:
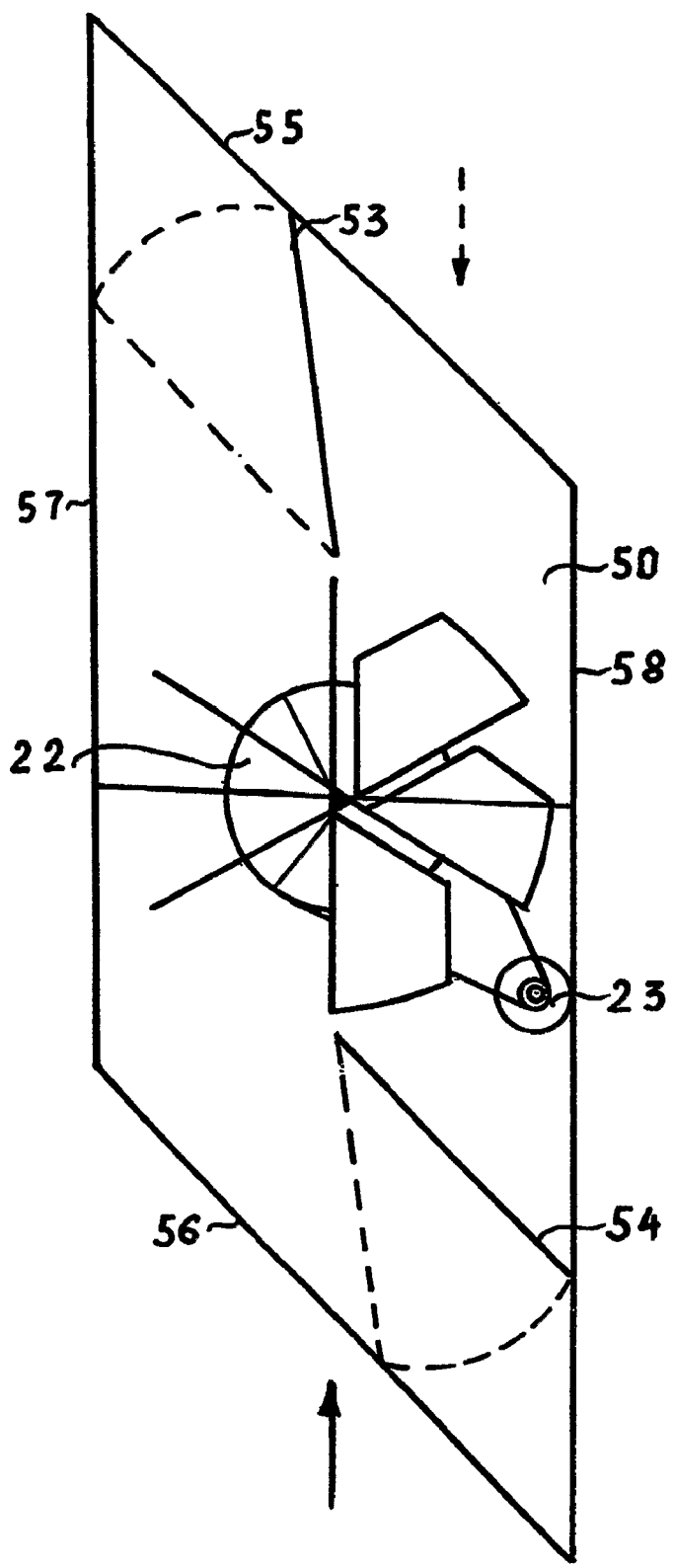
FIG. 9 is a plane top view of the system module for harvesting the kinetic energy of tides.

The embodiment B is the system assembly comprising an array of interconnected submersible units or modules capable of harvesting the kinetic energy of tides that alternate direction of their movement on 180 degrees. Each system unit or module (see FIG. 9) contains a water current energy converter positioned in a protecting housing 50.

A converter consists of a detachable vertical axis hydro-turbine 22, analogous to that described in the embodiment A, the detachable electrical generator 23, and two detachable flow deflectors 53 and 54.

Symmetrically located in inlet/outlet areas of the module, the flow deflectors 53 and 54 are secured to the housing in a pivotal manner. The free end of each flow deflector is able to rotate in the sector restricted by the filter panels 55, 56 and screen panels 57, 58 incorporated into protecting housing 50. The arrangement of the flow deflectors is such that they are urged by incoming flow of water to rotate toward the screen panels while the outgoing flow of water rotates the flow deflectors towards the filter panels thus creating the funneling channel, analogous to described in the embodiment A, on the energy generating side of the paddlewheel.

When the flow of tidal currents reverses, the flow of water through the funneling channels also reverses. However, the paddlewheel continues to rotate in the same direction. Hence, the turbine provides a unidirectional rotation regardless of the directions of the tidal currents.

The system module's protecting housing 50 is a strong steel frame having a symmetrical shape of the right rhomboid prism, which supports the turbine 22, flow deflectors 53 and 54, and the electrical generator 23.

Embodiment C

The embodiment C is the system assembly comprising an array of interconnected units or modules capable of harvesting the kinetic energy of wind. Each system unit or module depicted in FIGS. 10 and 11 contains a wind energy converter positioned in a housing 60.

Figure 10:
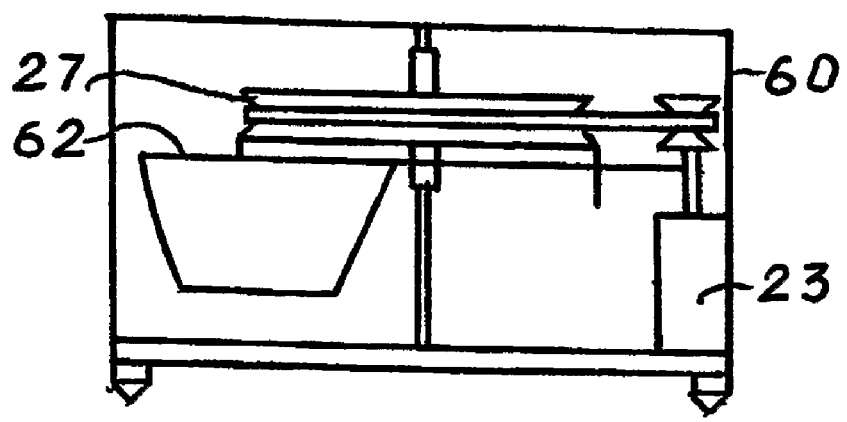
FIG. 10 is a frontal view of the system module for harvesting the kinetic energy of wind.
Figure 11:
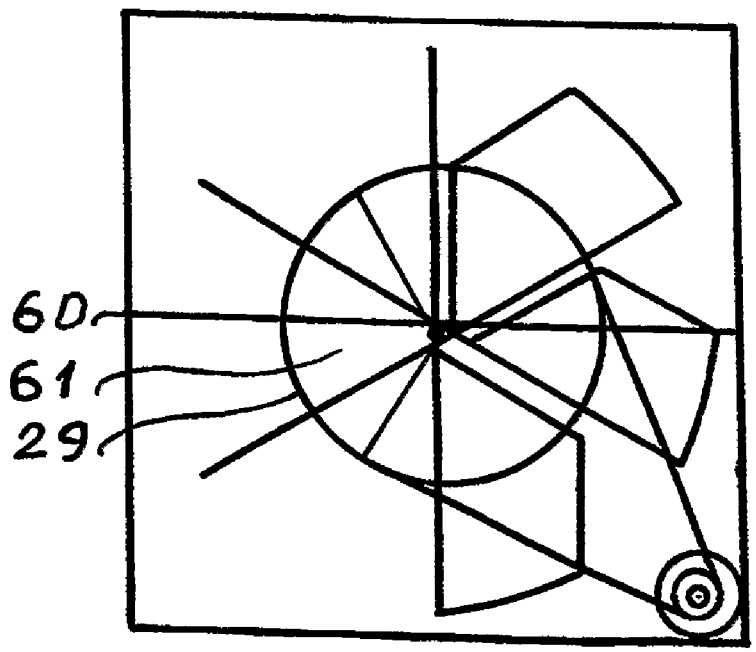
FIG. 11 is a plane top view of FIG. 10.

A converter consists of a detachable vertical axis turbine 61 with a set of paddles 62 located below the working wheel, and the detachable electrical generator 23, connected to the wheel's outer diameter (rim) 29, as shown in FIGS. 10 and 11.

The system module's housing 60 is a strong steel frame having a shape of the right square prism. Additionally, the housing includes the detachable screens to prevent collisions with birds.

Figure 12:
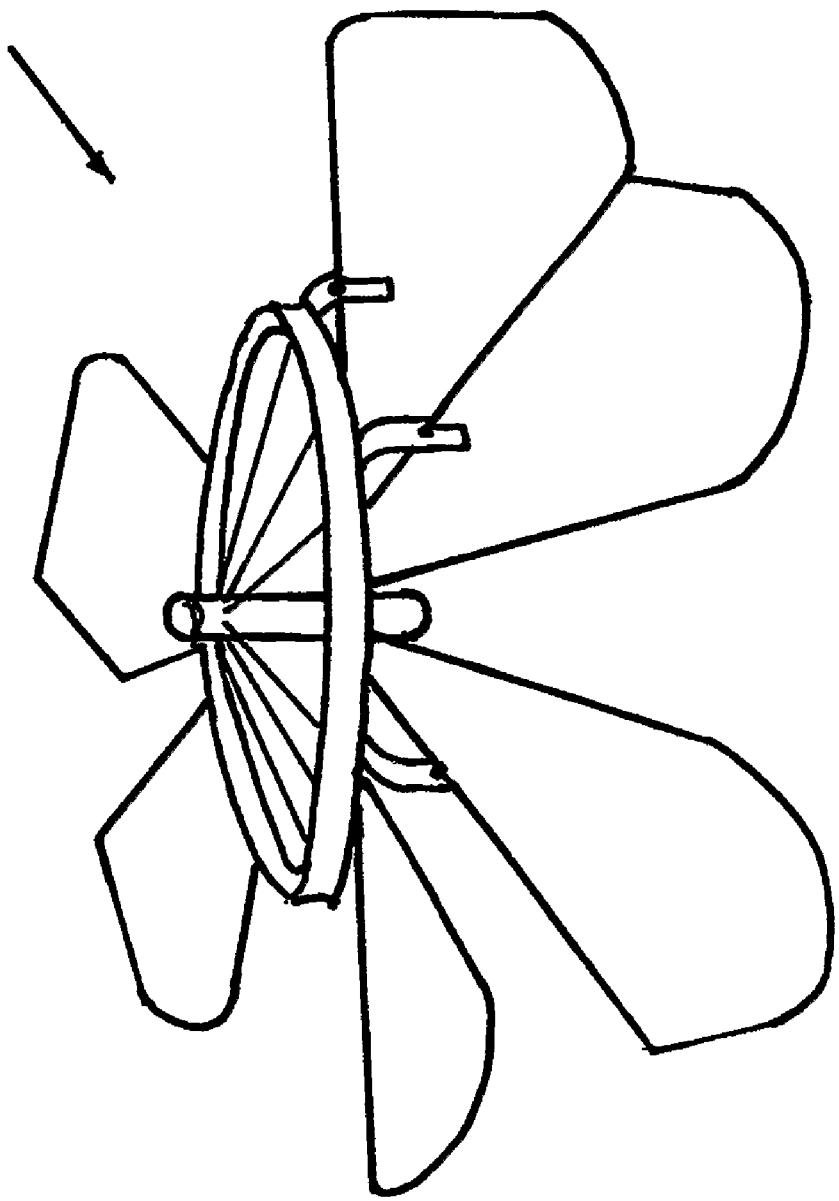
FIG. 12 is a schematic view of a paddlewheel wind turbine.

This vertical axis wind turbine, illustrated separately in FIG. 12, works in a similar way as a turbine for water applications described in the embodiments A and B. The turbine's paddles and blades can be produced from any suitable lightweight and strong material, and are of the same design as shown in FIGS. 3 through 5.

The presented turbine provides unidirectional rotation for any wind direction and it does not have to be directed into the wind. In contrast, the conventional horizontal axis turbines must be rotated to face the wind direction.

For wind power applications, a plurality of modules may be stacked vertically (similarly to FIG. 6). Each vertical stack may be supported in any suitable manner and can be anchored to the ground by guy wires. Any desired number of modules may be provided in any desired number of vertical stacks. One or more electrical generators may be provided in communication with modules. A generator may be individually associated with each module, or plural modules may be connected via a suitable transmission to a single generator, as illustrated in FIG. 6.

The array of modular systems may be located in any suitable windy site, as is known in the art, for example for locating traditional windmill-type wind farms. At the same time, the flexibility of the present invention allows it to be used in many locations, in which traditional horizontal axis turbines cannot be used, such as building rooftops, telecommunications, water and power line towers, etc.

The wind turbine's design having one set of paddles, like that shown in FIG. 12, is also exceptionally suitable in very shallow water currents were none of the prior art designs can be used.

Embodiment D

The embodiment D is the system assembly comprising an array of interconnected venturi-shaped bidirectional converting modules capable of harvesting the kinetic energy of tides.

Figure 13:
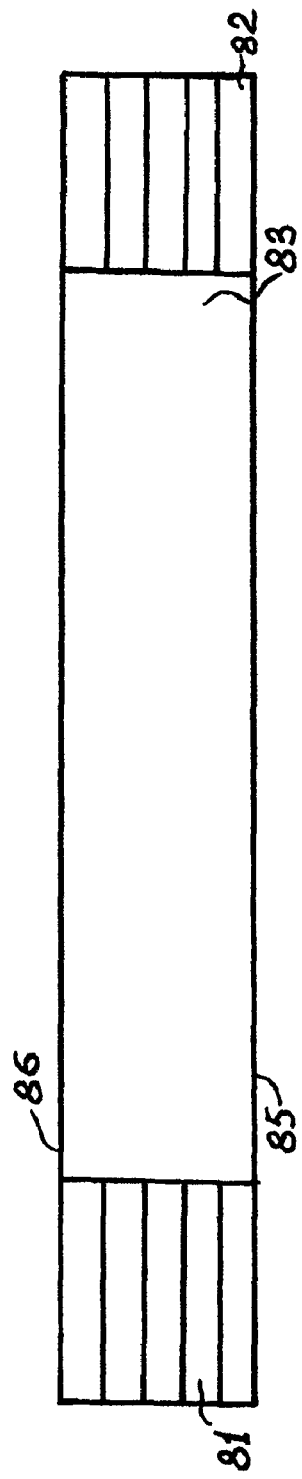
FIG. 13 is a frontal view of the bidirectional venturi-shaped system module for harvesting the kinetic energy of tides.
Figure 14:
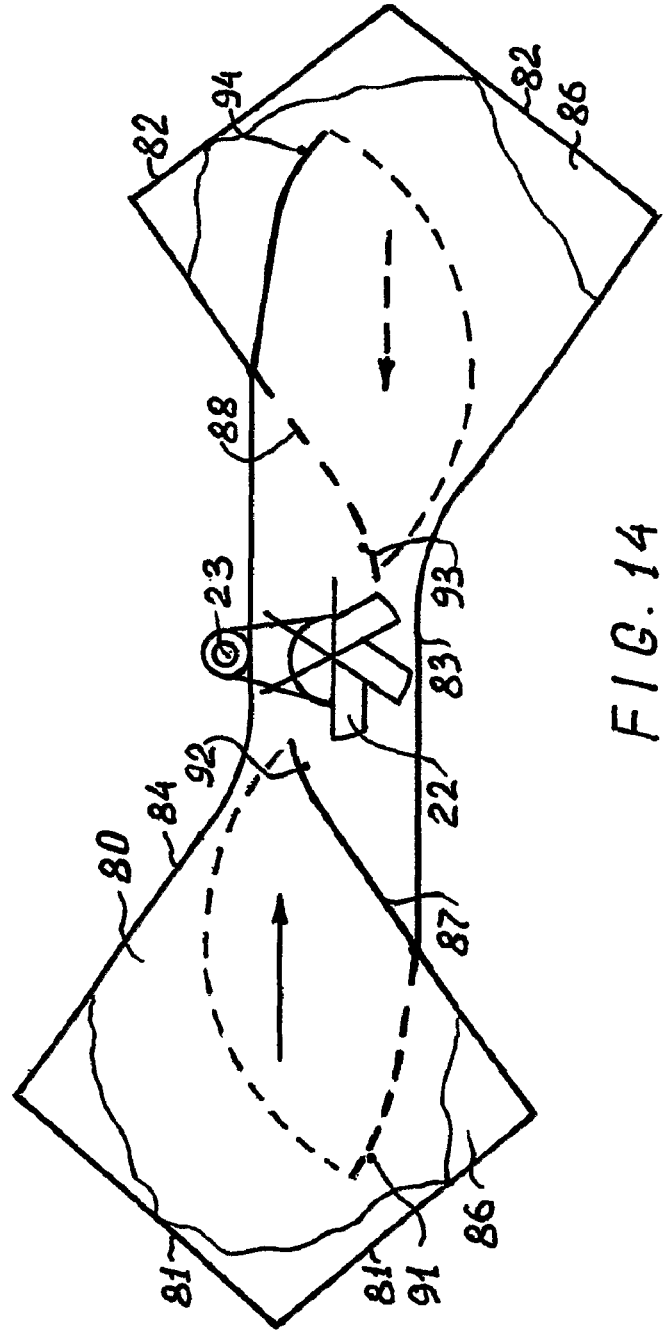
FIG. 14 is a top view of FIG. 13.

Power available from a turbine increases as the cube of the velocity. If the velocity is doubled, the available power then increases by a factor of eight. It is therefore important to make use of velocities that are as high as possible, which would enable the number of turbines to be significantly reduced, and this would have a marked effect on the capital cost. This is achieved through the use of the venturi-shaped bidirectional converting modules shown in FIGS. 13 and 14.

This module consists of a detachable vertical axis hydro-turbine 22, analogous to the one described in the embodiment A, the detachable electrical generator 23, filter panels 81 and 82, curved side screen panels 83 and 84, the flat bottom screen panel 85, the flat top screen panel 86, and a pair of flow deflectors 87 and 88. The flow deflectors are symmetrically located in the inlet/outlet areas of the module and secured to the venturi-shaped protective housing 80 in a pivotal manner.

The free end of each flow deflector is able to rotate inside the sector restricted by the stops 91, 92 and stops 93, 94, which are incorporated into protective housing 80. The arrangement of the deflectors is such that they are forced to rotate by the incoming flow of water toward the stops 92 and 93, while the outgoing flow of water rotates the deflectors toward the stops 91 and 94. This arrangement together with the screen panels 83, 84 and 85, 86 creates venturi-shaped funneling channels with a gradually contracting rectangular cross-section that heads to the turbine blades on the energy generating side of the paddlewheel.

When the flow of a tidal current reverses, the flow of water through the funneling channels also reverses. However, the paddlewheel continues to rotate in the same direction. Hence, the turbine maintains a unidirectional rotation regardless of the direction of tidal currents.

The system module's protecting housing 80 is a venturi-shaped strong steel frame, which supports all of the above-mentioned components of the module. The filter panels 81 and 82, made of steel bars, cover V-shaped inlets of the housing 80 to prevent clogging of the of the converter by submerged objects (debris) carried by water current.

The present invention is not to be limited by what has been particularly shown and described, except as indicated by the appended claims.

The embodiments of the invention in which an exclusive property or privilege is claimed are defined as follows:

1. A vertical axis paddlewheel type turbine for converting kinetic energy of river or ocean currents into electricity consisting of:
   a. a working wheel, comprising a hub mounted via bearings on an inner vertical axis to a protecting housing
   b. a first set of paddles located above said working wheel wherein each of said paddles includes a pair of floatable blades, having a partial segment profile, which are asymmetrically and non-rotatably attached by their leading edges to both ends of a pole in a mutually perpendicular orientation c. a second set of paddles located below said working wheel wherein each of said paddles includes a pair of sinkable blades, having a partial segment profile, which are asymmetrically and non-rotatably attached by their leading edges to both ends of a pole in a mutually perpendicular orientation
d. paddle support members fixedly mounted to a rim of said working wheel for holding said paddles and limiting the free rotation of said paddles within the angle range of 0 to 90 degrees
e. a plurality of radial spokes connecting said wheel's rim to said wheel's hub.

2. A vertical axis paddlewheel type turbine for converting kinetic energy of river or ocean currents into electricity consisting of:
   a. a working wheel, comprising a hub mounted via bearings on an inner vertical axis to a protecting housing
   b. a set of paddles located above said working wheel wherein each of said paddles includes a pair of floatable blades, having a partial segment profile, which are asymmetrically and non-rotatably attached by their leading edges to both ends of a pole in a mutually perpendicular orientation
   c. paddle support members fixedly mounted to a rim of said working wheel for holding said paddles and limiting the free rotation of said paddles within the angle range of 0 to 90 degrees
   d. a plurality of radial spokes connecting said wheel's rim to said wheel's hub.

3. A vertical axis paddlewheel type turbine for converting kinetic energy of river or ocean currents into electricity consisting of:
   a. a working wheel, comprising a hub mounted via bearings on an inner vertical axis to a protecting housing
   b. a set of paddles located below said working wheel wherein each of said paddles includes a pair of sinkable blades, having a partial segment profile, which are asymmetrically and non-rotatably attached by their leading edges to both ends of a pole in a mutually perpendicular orientation
   c. paddle support members fixedly mounted to a rim of said working wheel for holding said paddles and limiting the free rotation of said paddles within the angle range of 0 to 90 degrees
   d. a plurality of radial spokes connecting said wheel's rim to said wheel's hub.

4. A vertical axis paddlewheel type turbine for converting kinetic energy of wind into electricity consisting of:
   a. a working wheel, comprising a hub mounted via bearings on an inner vertical axis to a protecting housing
   b. a set of paddles located below said working wheel wherein each of said paddles includes a pair of blades, having a partial segment profile, which are asymmetrically and non-rotatably attached by their leading edges to both ends of a pole in a mutually perpendicular orientation
   c. paddle support members fixedly mounted to a rim of said working wheel for holding said paddles and limiting the free rotation of said paddles within angle range of 0 to 90 degrees
   d. a plurality of radial spokes connecting said wheel's rim to said wheel's hub.

\* \* \* \* \*